Aug. 25, 1936.      N. A. CLARKE      2,051,823
BICYCLE ACCESSORY
Filed Nov. 26, 1935
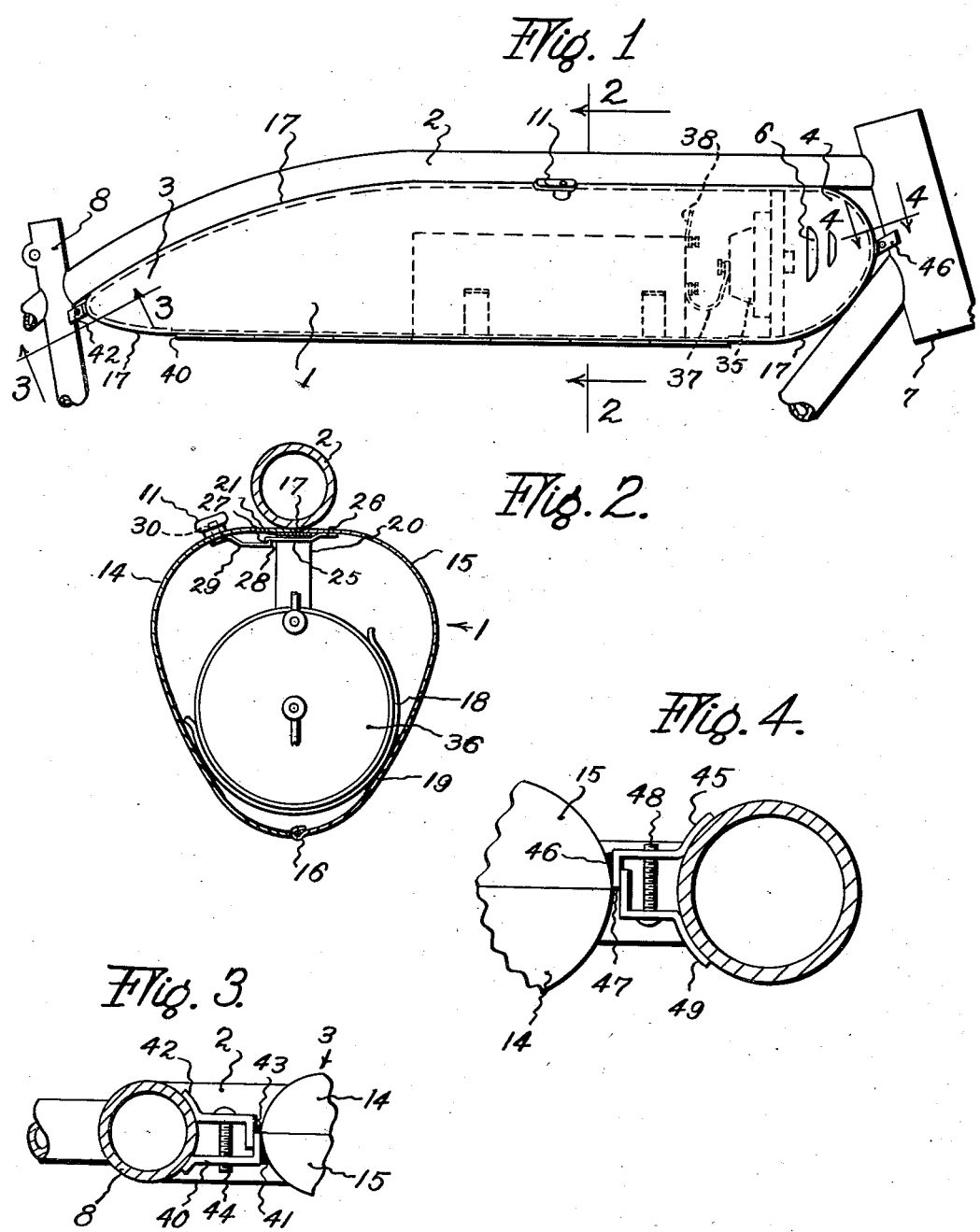
INVENTOR
NORMAN A. CLARKE
BY
Chapin+Neal
ATTORNEYS Patented Aug. 25, 1936

2,051,823

UNITED STATES PATENT OFFICE 2,051,823

BICYCLE ACCESSORY

Norman A. Clarke, Westfield, Mass., assignor to The Westfield Manufacturing Company, Westfield, Mass., a corporation of Massachusetts Application November 26, 1935, Serial No. 51,658

1 Claim. (Cl. 224—35)

This invention relates to an improved box construction for assembly with a bicycle frame. It is intended to hold electric batteries, for example, and may be considered as a battery box. It is common to provide a tank-like structure hung from the top bar of a bicycle frame. It usually simulates the gasoline tank of a motorcycle. But on a bicycle it is used as a box. Prior art structures of this type for bicycles, by their holding clips and other constructional features such as the door in the side and its seam, give a cluttered appearance to the bicycle. The frame and the battery box are not related to give a built-together appearance.

A main object of my improvement is to provide a bicycle box for battery use which will merge with the construction of the frame to such an extent as to give a built-in appearance to the combination. I accomplish this by locating certain of the constructional features of the box with relation to the bicycle frame parts so that such features are effectively hidden.

The way I accomplish this and other objects will now be fully disclosed and pointed out in the claim.

In the drawing,

Fig. 1 is a side view of the tank in place and attached to the bicycle frame;

Fig. 2 is a section substantially on line 2—2 of Fig. 1; and

Figs. 3 and 4 are enlarged fragmentary views taken on lines 3—3 and 4—4 of Fig. 1, showing the method of attaching the tank to the frame.

Referring to Fig. 1, the tank 1 is shaped to fit snugly along the top bar 2 of the frame, the ends being rounded at 3 and 4 to provide a smooth streamline appearance. Louvres 6 are provided near the front end of the tank for decoration or for emission of the sound from the horn. The tank is secured to the head post 7 by clips best shown in Fig. 4 and the tail post 8 by clips best shown in Fig. 3, thus leaving the top bar 2 entirely unencumbered by the customary loops for securing such a tank. The only projection that breaks the outer surface of the tank 1 is the handle 11 which locks the tank when in a "closed" position.

Referring to Fig. 2, the tank 1, which in crosssection is roughly the shape of an inverted pear, is made of two halves 14 and 15 hinged at the bottom at 16 and abutting at 17 underneath bar 2 of the frame. Liner 20 is spot welded to member 15 near the edge 17, providing a lip 21 extending underneath the member 14 and fitting closely against the under surface thereof, all along the seam 17, strengthening the parts 14 and 15 at their abutting edges and forming an inner wall to keep dirt and moisture from penetrating through the seam 17. Battery clips 18 holding a battery 36 are spot welded to member 15 at 19.

Halves 14 and 15 are held together by a locking mechanism comprising a clip 25 spot welded at 26 to member 15 and having a lip 27 which coacts with lip 28 of a latch 29. Latch 29 is provided with a pivot 30 which passes through the wall of member 14 and is operated by handle 11.

Referring to Fig. 1, a horn 35, which may be secured to the inside of the tank in any convenient manner, is connected by wire 37 to battery 36, and wire 38 extends from the tank and connects to a horn button located at any desired place on the bicycle. The halves (see Fig. 1) 14 and 15 are split along the line 17 from the ends 40 of the hinge 16 so that when the latch 29 is disengaged by turning handle 11, the tank will open horizontally, giving complete access to horn 35 and battery 36.

It is clear from the description and drawing that seam 17 lies under bar 2 and is concealed at the ends by tailpost 8 and head post 7.

Referring to Fig. 3, the rear end 3 of the tank has a clip 40 welded to member 15 at 41, the clip 40 extending for a short arc around the tail post 8. Clip 42 cooperates with clip 40 at 43 and screw 44 passes through clip 42 and is tightened into clip 40, thus providing a clamp at this point.

Referring to Fig. 4, clip 45 is welded to member 15 of the tank at 46 and fits against the head post 7, contacting the periphery for a short arc. Clip 49 coacts with clip 45 at 47 and screw 48 passes through clip 49 and tightens into clip 45.

The construction of the end clamps as shown, when tightened, will result in enough endwise pressure against the tank to wedge the tank in place and hold it without requiring the clamps to embrace the head post and seat post more than a short distance.

Inasmuch as member 15 only is attached to the head and tail posts, member 14 acts as a door and is free to swing open as previously described. Also, by supporting the tank at the ends, and hiding the seam 17 completely, the symmetry of the entire construction is aided.

I claim:

An accessory box for mounting within the confines of a bicycle frame which comprises two elongated, outwardly curved half box members hinged together along their lower edges, the upper edges of said halves abutting when the box is closed, the upper surface of the box conforming in longitudinal profile to the under surface of the top bar of the bicycle frame, two forked clamps secured one at each end of the box to respectively engage and partially surround the head post bar and the seat post bar of the frame, said clamps each comprising opposed members and means to draw said members together to wedge the box tightly between the head post bar and the seat post bar with the abutting upper edges of the box substantially in contact with and masked by the under face of the top bar of the frame when the box is closed, the forward portion of the lower edge of the box engaging the bicycle frame adjacent the head post bar, said two clamping means forming the sole means for securing the box in the frame, a latch carried by one of the box halves, for releasably holding the upper edges of the box in abutting relation, and an operating handle for said latch offset from the abutting edges of the box sufficiently to clear the top bar and providing means for swinging one of the box halves about said hinge to withdraw the edge of that half from beneath the top bar to open the box.

NORMAN A. CLARKE.